(12) United States Patent
Li et al.

(10) Patent No.: US 8,759,418 B2
(45) Date of Patent: *Jun. 24, 2014

(54) UREA-TERMINATED POLYURETHANE DISPERSANTS

(75) Inventors: Xiaoqing Li, Newark, DE (US); Tyau-Jeen Lin, Chadds Ford, PA (US); Patrick F. McIntyre, West Chester, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 267 days.

This patent is subject to a terminal disclaimer.

(21) Appl. No.: 12/990,959

(22) PCT Filed: May 22, 2009

(86) PCT No.: PCT/US2009/045008
§ 371 (c)(1), (2), (4) Date: Nov. 4, 2010

(87) PCT Pub. No.: WO2009/143441
PCT Pub. Date: Nov. 26, 2009

(65) Prior Publication Data
US 2011/0065861 A1  Mar. 17, 2011

Related U.S. Application Data

(60) Provisional application No. 61/128,638, filed on May 23, 2008.

(51) Int. Cl.
| | | |
|---|---|---|
| B41J 2/01 | (2006.01) | |
| B41J 2/17 | (2006.01) | |
| B41J 2/175 | (2006.01) | |
| C08G 18/08 | (2006.01) | |
| C08G 18/28 | (2006.01) | |
| C08J 3/00 | (2006.01) | |
| C08K 3/20 | (2006.01) | |
| C08L 75/00 | (2006.01) | |
| C09D 5/00 | (2006.01) | |
| C09D 11/00 | (2014.01) | |
| G01D 11/00 | (2006.01) | |

(52) U.S. Cl.
USPC .......... 523/160; 347/1; 347/85; 347/95; 347/100; 523/161; 524/589; 524/590; 524/591; 524/839; 524/840

(58) Field of Classification Search
USPC .......... 523/160, 161; 524/589, 590, 591, 839, 524/840; 347/1, 85, 95, 100
See application file for complete search history.

(56) References Cited

U.S. PATENT DOCUMENTS

| | | |
|---|---|---|
| 3,412,054 A | 11/1968 | Milligan et al. |
| 3,419,553 A | 12/1968 | Dieterich et al. |
| 3,479,310 A | 11/1969 | Dieterich et al. |
| 4,108,814 A | 8/1978 | Reiff et al. |
| 4,269,748 A | 5/1981 | Nachtkamp et al. ......... 260/29.2 |
| 4,303,774 A | 12/1981 | Nachtkamp et al. ............ 528/71 |
| 4,408,008 A | 10/1983 | Markusch |
| 4,501,852 A | 2/1985 | Markusch et al. ............ 524/591 |
| 4,647,643 A | 3/1987 | Zdrahala et al. |
| 4,701,480 A | 10/1987 | Markusch et al. |
| 4,801,644 A | 1/1989 | Coogan ......................... 524/839 |
| 4,829,122 A | 5/1989 | Pedain et al. ................. 524/591 |
| 5,022,592 A | 6/1991 | Zakheim et al. |
| 5,026,427 A | 6/1991 | Mitchell et al. |
| 5,047,294 A | 9/1991 | Schwab et al. ............. 428/432.1 |
| 5,085,698 A | 2/1992 | Ma et al. |
| 5,281,655 A | 1/1994 | Mitsuji et al. ................. 524/507 |
| 5,310,778 A | 5/1994 | Shor et al. |
| 5,679,138 A | 10/1997 | Bishop et al. |
| 5,746,818 A | 5/1998 | Yatake ........................ 106/31.86 |
| 5,760,123 A | 6/1998 | Vogt-Birnbrich et al. .... 524/500 |
| 5,804,647 A | 9/1998 | Nachtkamp et al. .......... 524/591 |
| 5,891,231 A | 4/1999 | Gnerlich et al. |
| 5,976,232 A | 11/1999 | Gore |
| 5,990,245 A | 11/1999 | Esselborn et al. ......... 525/330.6 |
| 6,046,295 A | 4/2000 | Frisch, Jr. et al. ............... 528/28 |
| 6,133,890 A | 10/2000 | Damiani |
| 6,248,839 B1 | 6/2001 | Esselborn et al. ......... 525/329.7 |
| 6,316,586 B1 | 11/2001 | Sunkara et al. ............... 528/300 |
| 6,440,203 B2 | 8/2002 | Kato ........................... 106/31.6 |
| 6,450,632 B1 | 9/2002 | Tsang et al. .................... 347/96 |
| 6,608,168 B1 | 8/2003 | Ng ................................. 528/272 |
| 6,852,156 B2 | 2/2005 | Yeh et al. |

(Continued)

FOREIGN PATENT DOCUMENTS

| | | |
|---|---|---|
| EP | 1 209 180 A | 5/2002 |
| EP | 1 258 510 A1 | 11/2002 |

(Continued)

OTHER PUBLICATIONS

ISR and WO of the ISA, European Patent Office, Rijswijk, NL, Sita Camara, Authorized Officer [ISR] and European Patent Office, Munich, DE, Frank Heidenhain, Authorized Officer [WO of the ISA], in PCT/US2009/045008, PCT counterpart of U.S. Appl. No. 12/990,959, the present application, Aug. 14, 2009.

(Continued)

Primary Examiner — Patrick Niland
(74) Attorney, Agent, or Firm — John H. Lamming

(57) ABSTRACT

The present invention relates to urea terminated polyurethane dispersants based on certain diols which have grafted alkyl, aryl or fluoroalkyl substituents, aqueous dispersions of such polyurethanes, the manufacture of the urea terminated polyurethane dispersions and inks containing pigments and/or disperse dyes dispersed with these urea terminated polyurethane dispersants.

20 Claims, No Drawings

(56) References Cited

U.S. PATENT DOCUMENTS

| | | | |
|---|---|---|---|
| 6,852,823 B2 | 2/2005 | Sunkara et al. | 528/61 |
| 6,908,185 B2 | 6/2005 | Chen et al. | 347/96 |
| 6,946,539 B2 | 9/2005 | Sunkara | 528/76 |
| 7,176,248 B2 | 2/2007 | Valentini et al. | 523/160 |
| 2001/0012574 A1 | 8/2001 | Matsubayashi et al. | 428/694 |
| 2002/0044185 A1 | 4/2002 | Koitabashi et al. | 347/98 |
| 2003/0089277 A1 | 5/2003 | Zakheim et al. | |
| 2003/0160851 A1 | 8/2003 | Baccay et al. | |
| 2003/0184629 A1 | 10/2003 | Valentini et al. | 347/100 |
| 2004/0092622 A1 | 5/2004 | Pearlstine et al. | 523/160 |
| 2004/0176530 A1 | 9/2004 | Tielemans et al. | 524/589 |
| 2004/0201658 A1 | 10/2004 | Jackson et al. | 347/100 |
| 2004/0229976 A1 | 11/2004 | Kakiuchi et al. | 523/160 |
| 2004/0249061 A1 | 12/2004 | Sunkara et al. | 524/589 |
| 2005/0018154 A1 | 1/2005 | Box et al. | 355/30 |
| 2005/0090599 A1 | 4/2005 | Spinelli | |
| 2005/0137375 A1 | 6/2005 | Hansen et al. | 528/44 |
| 2005/0176848 A1 | 8/2005 | Chen et al. | 528/160 |
| 2005/0176921 A1 | 8/2005 | Sunkara et al. | 528/279 |
| 2005/0182154 A1 | 8/2005 | Berge et al. | 523/160 |
| 2005/0215663 A1 | 9/2005 | Berge et al. | |
| 2006/0119679 A1 | 6/2006 | Kruger et al. | 347/100 |
| 2006/0183852 A1 | 8/2006 | Liu et al. | 524/591 |
| 2007/0129254 A1 | 6/2007 | Sunkara | 528/44 |
| 2007/0259989 A1 | 11/2007 | Berge et al. | 523/401 |
| 2008/0039582 A1 | 2/2008 | Sunkara et al. | |
| 2008/0175875 A1 | 7/2008 | Sunkara et al. | 424/401 |

FOREIGN PATENT DOCUMENTS

| | | |
|---|---|---|
| EP | 11454968 | 8/2004 |
| EP | 1 167 466 B1 | 12/2004 |
| EP | 1 454 968 A1 | 9/2009 |
| WO | 00/24836 | 9/1999 |
| WO | WO 00/24836 A1 | 5/2000 |
| WO | WO 2006/027544 A1 | 10/2004 |
| WO | WO 2005/071026 A1 | 8/2005 |

OTHER PUBLICATIONS

ISR and WO of the ISA, European Patent Office, Rijswijk, NL, NL, Sita Camara, Authorized Officer [ISR] and European Patent Office, Munich, DE, Sylvie Scheuer, Authorized Officer [WO of the ISA], in PCT/US2008/086123, PCT counterpart of copending U.S. Appl. No. 12/328,158, Apr. 24, 2009.

ISR and WO of the IA, European Patent Office, Rijswijk, NL, Damiano Vizzini, Authorized Officer [ISR], European Patent Office, Munich, DE, Wojciech Zeslawski [WO of the ISA], Authorized Officer, both PCT/US2009/044968, in PCT counterpart of copending U.S. Appl. No. 12/989,079, Aug. 13, 2009.

ISR and WO of the ISA, European Patent Office, Rijswijk, NL, Sita Camara, Authorized Officer [ISR] and Ute Neugebauer, Authorized Officer [WO of the ISA], in PCT/US2008/086114, PCT counterpart of copending U.S. Appl. No. 12/327,194; Jun. 3, 2009.

ISR and WO of the ISR, European Patent Office, Rijswijk, NL, Jolanda Zurkinden, Authorized Officer [ISR], European Patent Office, Munich, DE, Wojciech Zeslawski, Authorized Officer [WO of the ISA], in PCT/US2008/086130, PCT counterpart of copending U.S. Appl. No. 12/328,110, Mar. 11, 2009.

ISR and WO of the ISA, European Patent Office, Rijswijk, NL, Laurent Tissot, Authorized Officer [ISR], European Patent Office, Munich, DE, Frank Heidenhain, Authorized Officer [WO of the ISA], in PCT/US2009/044994, PCT counterpart of copending U.S. Appl. No. 12/990,954, Aug. 4, 2009.

Ralph D. Nelson, Jr., Dispersion of Powders in Liquids, Kirk-Othmer Encyclopedia of Chemical Technology, John Wiley & Sons, 2002.

S.V. Conjeevaram et al., Block Copolyurethanes Based on Polyoxytrimethylene Glycols, Journal of Polymer Science, 23, 429-444, Wiley & Sons, 1985.

UREA-TERMINATED POLYURETHANE DISPERSANTS

CROSS-REFERENCE TO RELATED APPLICATION

This application claims priority under 35 U.S.C. §119 from U.S. Provisional Application Ser. No. 61/128,638, filed May 23, 2008.

FIELD OF THE INVENTION

The present invention relates to urea-terminated polyurethane dispersants based on certain dials which have grafted alkyl, aryl or fluoroalkyl substituents. These polyurethane dispersants are effective for dispersion of particles, especially pigment particles. Pigments dispersed with the polyurethane dispersants can be used in ink jet inks.

BACKGROUND OF THE INVENTION

Disclosed herein are novel polyurethane dispersants and stable aqueous particle dispersions made therefrom, especially pigment dispersions, a process of making the pigment dispersions, and use thereof in ink jet inks.

Polyurethane polymers can be manufactured by a variety of well-known methods, but are often prepared by first making an isocyanate-terminated "pre-polymer" from polyols, polyisocyanates and other optional compounds, then chain-extending and/or chain-terminating this pre-polymer to obtain a polymer possessing an appropriate molecular weight and other properties for a desired end use. Tri- and higher-functional starting components can be utilized to impart some level of branching and/or crosslinking to the polymer structure (as opposed to simple chain extension).

Polyurethane dispersions that are used as pigment dispersants have been described in U.S. Pat. No. 6,133,890. These polyurethanes are prepared with an excess of isocyanate reactive group and are limited to the presence of polyalkylene oxide components. Aqueous polyurethane dispersants have found limited use as dispersants for pigments and the like.

None of the above publications disclose polyurethane dispersions used as pigment dispersants that are derived from water dispersible urea terminated polyurethanes based on certain dials.

There is still a need for polyurethane dispersions which are stable and provide improved performance properties when utilized in desired end uses, such as when utilized as a pigment dispersant in ink jet ink applications. These polyurethanes, as discovered herein, can be used as dispersants for pigments, especially pigments for inkjet inks, and posses a unique balance of properties especially desirable for ink jet ink applications.

SUMMARY OF THE INVENTION

The use of polymeric conventional dispersants is well established as a means to make stable dispersants of particles, especially pigment particles. In general, these conventional dispersants have, at least, modest water solubility and this water solubility is used as a guide to predicting dispersion stability. These dispersants are most often based on acrylate/acrylic compounds. During diligent searching for new polymeric dispersants, a new class of dispersants has been found that are based on urea terminated polyurethanes, where the predominant isocyanate reactive group is a hydroxyl which is part of the selected diols which have grafted-alkyl, aryl or fluoroalkyl substituents. The ionic content in these dispersants isocyanate-reactive components that have ionic substitution.

Accordingly, there are provided herein dispersants, namely urea terminated polyurethane dispersants, that lead to stable aqueous dispersions, stable aqueous dispersions containing these polyurethane dispersants, methods of making urea terminated polyurethane dispersants, inks based on urea terminated polyurethane dispersants, inks sets comprising at least one ink based on an urea terminated polyurethane dispersants, and methods of ink jet printing that use the inks based on urea terminated polyurethane dispersants.

An embodiment provides an aqueous particle dispersion comprising a particle, preferably a colorant particle, and an urea terminated polyurethane ionic dispersant in an aqueous vehicle, wherein:

(a) the ionic dispersant is physically adsorbed to the particle, (b) the polymeric ionic dispersant stably disperses the pigment in the aqueous vehicle, (c) the average particle size of the dispersion is less than about 300 nm; and wherein the urea terminated polyurethane ionic dispersant comprises at least one compound of the general Structure (I):

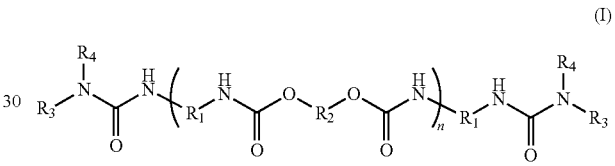

(I)

$R_1$ is alkyl, substituted alkyl, substituted alkyl/aryl from a diisocyanate, $R_2$ is alkyl, substituted/branched alkyl from a diol, $R_3$ is alkyl, branched alkyl, or a isocyanate reactive group from an amine terminating group, $R_4$ is hydrogen, alkyl, branched alkyl, or a isocyanate reactive group from the amine terminating group;

wherein the isocyanate reactive group is selected from the group consisting of hydroxyl, carboxyl, mercapto, and amido;

n is 2 to 30;

and wherein $R_2$ is at least one $Z_2$ and at least one $Z_1$ or $Z_3$ $Z_2$ is a diol substituted with an ionic group;

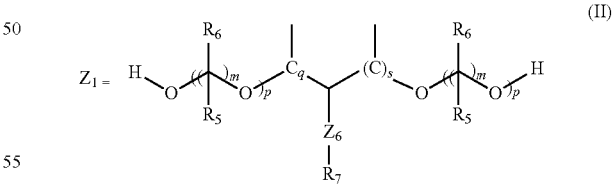

(II)

p is greater than or equal to 1, when p is 1, m is greater than or equal to 2 to about 12, when p is 2 or greater, m is greater than or equal to 2 to about 12, where q is 1 to about 4 and s is 0, or 1 to about 4;

$R_5$, $R_6$ each is independently selected from the group consisting of hydrogen, alkyl, substituted alkyl, and aryl; wherein the $R_5$ or $R_6$ are the same or different with each substituted methylene group; wherein the $R_5$ and $R_5$ or $R_6$ can be joined to form a cyclic structure;

$R_7$ is a urethane or urea grafted alkyl, substituted alkyl, aryl or fluorocarbon chain;

$Z_6$ is a bond or an ether linkage;

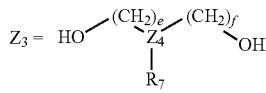

$$Z_3 = HO-(CH_2)_e-Z_4-(CH_2)_f-OH \quad\quad III$$
$$\qquad\qquad\quad|\qquad$$
$$\qquad\qquad\;R_7$$

e and f is 1 to 6, $Z_4$ is N or $CR_8$, wherein $R_8$ is selected from the group consisting of hydrogen, alkyl and aryl, when $Z_4$ is N or $CR_8$, $R_7$ is a urethane or urea grafted alkyl, aryl or fluorocarbon chain when $Z_4$ is N, $R_7$ is a urethane or urea grafted alkyl, substituted alkyl, aryl or fluorocarbon chain;

wherein the urea content of the urea-terminated polyurethane of general Structure (I) is at least 2 wt % of the polyurethane and at most about 14 wt % of the polyurethane, and wherein preferably the particle is a colorant and the colorant is selected from pigments and disperse dyes or combinations of pigments and disperse dyes.

A further embodiment wherein the aqueous polyurethane dispersant composition comprises an urea-terminated polyurethane as generally set forth above, wherein the polyurethane contains a sufficient amount of ionic functionality in order to render the polyurethane dispersed particles dispersible in the continuous phase of the dispersion.

Yet another embodiment provides a method of preparing a stable dispersion of particles such as pharmaceuticals and colorants. The first step in the preparation is preparing an aqueous dispersion of an aqueous urea terminated polyurethane composition comprising the steps:

(a) providing reactants comprising (i) at least one diol $Z_3$ or $Z_1$ as defined above ii) at least one polyisocyanate component comprising a diisocyanate, and (iii) at least one hydrophilic reactant comprising at least one isocyanate reactive ingredient containing an ionic group, $Z_2$, as defined above;

(b) contacting (i), (ii) and (iii) in the presence of a water-miscible organic solvent to form an isocyanate-functional polyurethane pre-polymer;

(c) adding water to form an aqueous dispersion; and (d) prior to, concurrently with, or subsequent to step (c), chain-terminating the isocyanate-functional pre-polymer with a primary or secondary amine.

The diol, diisocyanate and hydrophilic reactant may be added together in any order. The total moles of isocyanate groups exceed the moles of isocyanate reactive groups prior to the addition of the chain terminating agent.

The chain terminating amine is typically added prior to addition of water in an amount to react with substantially any remaining isocyanate functionality. The chain terminating amine is optionally a nonionic secondary amine.

If the hydrophilic reactant contains ionizable groups then, at the time of addition of water (step (c)), the ionizable groups must be ionized by adding acid or base (depending on the type of ionizable group) in an amount such that the polyurethane can be stably dispersed.

Additionally, at some point during the reaction (generally after addition of water and after chain extension), the organic solvent is substantially removed under vacuum to produce an essentially solvent-free dispersion.

After the polyurethane dispersion is prepared it is used in the dispersion of particles by known dispersion techniques.

Another embodiment provides an aqueous colored ink jet ink comprising an aqueous colorant dispersion as described above, having from about 0.1 to about 10 wt % pigment based on the total weight of the ink, a weight ratio of colorant to polyurethane dispersant of from about 0.5 to about 6, a surface tension in the range of about 20 dyne/cm to about 70 dyne/cm at 25° C., and a viscosity of lower than about 30 cP at 25° C.

Another embodiment provides an ink set comprising at least one cyan ink, at least one magenta ink and at least one yellow ink, wherein at least one of the inks is an aqueous pigmented ink jet ink as set forth above and described in further detail below.

The continuous phase of the aqueous dispersion, in addition to water, may further comprise water-miscible organic solvent. Optionally the level of organic solvent is from about 0 wt % to about 30 wt %, based on the weight of the continuous phase.

These polyurethane dispersants are effective dispersants for pigments, pharmaceuticals and other dispersions of small particles. The polyurethanes dispersions shown in Structure (I) can also be added to the aqueous ink as an additive.

These and other features and advantages of the present invention will be more readily understood by those of ordinary skill in the art from a reading of the following Detailed Description. Certain features of the invention which are, for clarity, described above and below as a separate embodiments, may also be provided in combination in a single embodiment. Conversely, various features of the invention that are described in the context of a single embodiment, may also be provided separately or in any subcombination.

DETAILED DESCRIPTION

Unless otherwise stated or defined, all technical and scientific terms used herein have commonly understood meanings by one of ordinary skill in the art to which this invention pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

As used herein, the dispersions produced with the polyurethane described above can be utilized to disperse particles, especially pigments for inkjet inks. These inks can be printed on all normally used inkjet substrates including textile substrates.

As used herein, the term "dispersion" means a two phase system where one phase consists of finely divided particles (often in the colloidal size range) distributed throughout a bulk substance, of the particles being the dispersed or internal phase and the bulk substance that continuous or external phase.

As used herein, the term "dispersant" means a surface active agent added to a suspending medium to promote uniform and maximum separation of extremely fine solid particles often of colloidal size. For pigments dispersants are most often polymeric dispersants. The polyurethane dispersants described herein are in fact dispersions themselves.

As used herein, the term "OD" means optical density.

As used herein, the term "aqueous vehicle" refers to water or a mixture of water and at least one water-soluble organic solvent (co-solvent).

As used herein, the tem "ionizable groups" means potentially ionic groups.

As used herein, the term "substantially" means being of considerable degree, almost all.

As used herein, the term "Mn" means number average molecular weight.

As used herein, the term "Mw" means weight average molecular weight.

As used herein, the term "Pd" means the polydispersity which is the weight average molecular weight divided by the number average molecular weight.

As used herein, the term "d50" means the particle size at which 50% of the particles are smaller; "d95" means the particle size at which 95% of the particles are smaller.

As used herein, the term "colorfastness" is described as the resistance of a material to change in any of its color characteristics, this term is especially useful for describing printed textiles.

As used herein, the term "washfastness" is described as the resistance to loss of the printed color/image after washing a printed textile.

As used herein, the term "Crock" is described as the resistance to rubbing off of a printed color/image after washing a printed textile.

As used herein, the term "cP" means centipoise, a viscosity unit.

As used herein, the term "pre-polymer" means the polymer that is an intermediate in a polymerization process, and can be considered a polymer.

As used herein, the term "AN" means acid number, mg KOH/gram of solid polymer.

As used herein, the term "neutralizing agents" means to embrace all types of agents that are useful for converting ionizable groups to the more hydrophilic ionic (salt) groups.

As used herein, the term "PUD" means the polyurethanes dispersions described herein.

As used herein, the term "BMEA" means bis(methoxyethyl) amine.

As used herein, the term "DBIDL" means dibutyltin dilaurate.

As used herein, the term "DMEA" means dimethylethanolamine.

As used herein, the term "DMIPA" means dimethylisopropylamine.

As used herein, the term "DEA" means diethanolamine

As used herein, the term "DMPA" means dimethylol propionic acid.

As used herein, the term "DMBA" means dimethylol butyric acid.

As used herein, the term "EDA" means ethylenediamine.

As used herein, the term "EDTA" means ethylenediaminetetraacetic acid.

As used herein, the term "HDI" means 1,6-hexamethylene diisocyanate.

As used herein, the term "GPC" means gel permeation chromatography.

As used herein, the term "IPDI" means isophorone diisocyanate.

As used herein, the term "TMDI" means trimethylhexamethylene diisocyanate.

As used herein, the term "TMXDI" means m-tetramethylene xylylene diisocyanate.

As used herein, the term "ETEGMA//BZMA//MAA" means the block copolymer of ethoxytriethyleneglycol methacrylate, benzylmethacrylate and methacrylic acid.

As used herein the term T650 means TERATHANE 650.

As used herein, the term "PO3G" means 1,3-propanediol.

As used herein, the term"DMPA" means dimethylol propionic acid

As used herein, the term "NMP" means n-Methyl pyrolidone.

As used herein, the term "TEA" means triethylamine.

As used herein, the term "TEOA" means triethanolamine.

As used herein, the term "TETA" means triethylenetetramine.

As used herein, the term "THF" means tetrahydrofuran.

As used herein, the term "Tetraglyme" means Tetraethylene glycol dimethyl ether.

TERATHANE650 is a 650 molecular weight, polytetramethylene ether glycol (PTMEG) from purchased from Invista, Wichita, Kans.

TERATHANE 250 is a 250 molecular weight, polytetramethylene ether glycol.

Pripol 2033 is a hydrocarbon diol from Uniqema, Netherland

Unless otherwise noted, the above chemicals were obtained from Aldrich (Milwaukee, Wis.) or other similar suppliers of laboratory chemicals.

Urea-Terminated Polyurethane Dispersants

Polyurethane polymers are, for the purposes of the present disclosure, polymers wherein the polymer backbone contains urethane linkage derived from the reaction of an isocyanate group (from, e.g., a di- or higher-functional monomeric, oligomeric and/or polymeric polyisocyanate) with a hydroxyl group (from, e.g., a di- or higher-functional monomeric, oligomeric and/or polymeric polyol). Such polymers may, in addition to the urethane linkage, also contain other isocyanate-derived linkages such as urea, as well as other types of linkages present in the polyisocyanate components and/or polyol components (such as, for example, ester and ether linkage).

During the study of structural features of urea terminated polyurethane dispersant systems, it was found that a diol which had alkyl, substituted alkyl, aryl and/or fluorocarbon chains grafted via urea or urethane linkages onto the dial offered advantages for the polyurethane dispersant.

The backbones of Structure (II) and (III) are trisubstituted with at least 2 hydroxyl groups and an amino group or 3 hydroxyl groups. The backbones of Structure II and III are substituted with one site which is either amino or one of the three hydroxyl groups, which are the reactive sites to form the grafted urea and urethane linkages to the alkyl, substituted alkyl, aryl and/or fluorocarbon chains.

For Structure (II) an optional backbone structure starts with glycerol. The hydroxyls can be reacted with epoxides to give the polyether structure of Structure (II). A single adduct of ethylene oxide on the hydroxyl groups have m=2, $R_5$ and $R_6$ hydrogen and p=1. Multiple adducts of ethylene oxide would result in larger values of p. The hydroxyl at $Z_6$ could also undergo condensation with the epoxide. For a propylene oxide adduct m=2, $R_5$ is methyl and $R_6$ is hydrogen for one of the methylene groups and $R_5$ and $R_6$ are both hydrogen for the other methylene group. A commercially available example of an alkylene oxide substituted glycerol is LG-650, A 260 MW polyether triol from Bayer.

Other tri-substituted triol candidates are 1,2,6-hexane triol, 1,2,4-butane triol, trimethylol ethane and the like.

For the backbone for Structure (III) a specific compound is diethanolamine. The reactivity of the amine relative to the two hydroxyl groups means the predominant form is the presence of $R_7$ grafted via a urea bond.

The $R_7$ group is initially terminated in an isocyanate group which reacts with the amino or hydroxyl group described previously. The range of substituents in $R_7$ alkyl, substituted alkyl, aryl and/or fluorocarbon can be chosen to adjust the hydrophobicity, the pigment compatible portions of the dispersant, etc. of the final urea terminated polyurethane dispersant.

The urea terminated polyurethane ionic dispersant is a urea terminated polyurethane of general Structure (I)

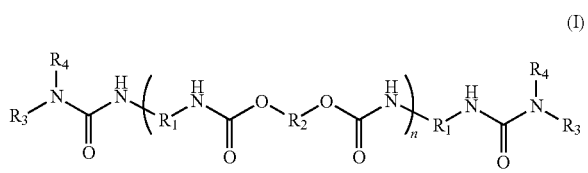

(I)

$R_1$ is alkyl, substituted alkyl, substituted alkyl/aryl from a diisocyanate, $R_2$ is alkyl, substituted/branched alkyl from a diol, $R_3$ is alkyl, branched alkyl, or a isocyanate reactive group from an amine terminating group, $R_4$ is hydrogen, alkyl, branched alkyl, or a isocyanate reactive group from the amine terminating group;

wherein the isocyanate reactive group is selected from the group consisting of hydroxyl, carboxyl, mercapto, and amido;

n is 2 to 30;

and wherein $R_2$ is at least one $Z_2$ and at least one $Z_1$ or $Z_3$, $Z_2$ is a dial substituted with an ionic group;

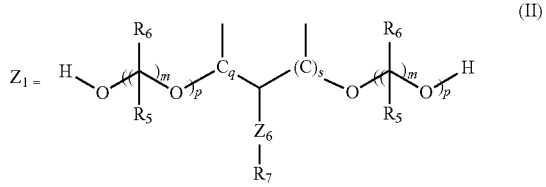

(II)

is greater than or equal to 1, when p is 1, m is greater than or equal to 2 to about 12, when p is 2 or greater, m is greater than or equal to 2 to about 12 where q is 1 to about 4 and s is 0, or 1 to about 4;

$R_5$, $R_6$ each is independently selected from the group consisting of hydrogen, alkyl, substituted alkyl, and aryl; where the $R_5$ or $R_6$ are the same or different with each substituted methylene group; where the $R_5$ and $R_5$ or $R_6$ can be joined to form a cyclic structure;

$R_7$ is a urethane or urea grafted alkyl, substituted alkyl, aryl or fluorocarbon chain, $Z_6$ a bond or an ether linkage;

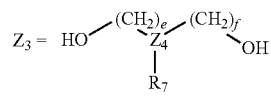

III e and f is 1 to 6, $Z_4$ is N or $CR_8$, where $R_8$ is hydrogen, alkyl or aryl, when $Z_4$ is N or $CR_8$, $R_7$ is a urethane or urea grafted alkyl, aryl or fluorocarbon chain when $Z_4$ is N, $R_7$ is a urethane or urea grafted alkyl, substituted alkyl, aryl or fluorocarbon chain, wherein a weight fraction of a urea terminating component part of the polyurethane is at least 2 wt % to the urethane resin, and at most about 14 wt % of the polyurethane, and further preferably wherein the particle is a colorant and the colorant is selected from pigments and disperse dyes or combinations of pigments and disperse dye.

The invention also relates to a method of preparing a stable dispersion of particles such as pharmaceuticals and colorants. The first step in the preparation is preparing an aqueous dispersion of an aqueous urea terminated polyurethane composition comprising the steps:

(a) providing reactants comprising (i) at least one diol $Z_3$ or $Z_1$ as defined above ii) at least one polyisocyanate component comprising a diisocyanate, and (iii) at least one hydrophilic reactant comprising at least one isocyanate reactive ingredient containing an ionic group, $Z_2$, as defined above;

(b) contacting (i), (ii) and (iii) in the presence of a water-miscible organic solvent to form an isocyanate-functional polyurethane pre-polymer;

(c) adding water to form an aqueous dispersion; and (d) prior to, concurrently with or subsequent to step (c), chain-terminating the isocyanate-functional pre-polymer with a primary or secondary amine The diol, diisocyanate and hydrophilic reactant may be added together in any order. The total moles of isocyanate groups exceed the moles of isocyanate reactive groups prior to the addition of the chain terminating agent.

The chain terminating amine is typically added prior to addition of water in an amount to react with substantially any remaining isocyanate functionality. The chain terminating amine is optionally a nonionic secondary amine.

If the hydrophilic reactant contains ionizable groups then, at the time of addition of water (step (c), the ionizable groups must be ionized by adding acid or base (depending on the type of ionizable group) in an amount such that the polyurethane can be stably dispersed.

Specifically, at some point during the reaction (generally after addition of water and after chain extension), the organic solvent is substantially removed under vacuum to produce an essentially solvent-free dispersion.

The advantageous features of the polyurethane dispersant are the alkyl, substituted alkyl, aryl and/or fluorocarbon chains grafted dial (Structures (II) and/or (III)) and the monofunctional amine which results in the urea termination. Without being bound by theory, these polyurethane dispersants perform better as dispersants for pigments etc. Also, the diol/urea termination combination seems to produce a relatively pure polyurethane that does not have contamination and/or extensive crosslinking that can lead to poorer performance dispersing pigments and the like.

It should be understood that the process used to prepare the polyurethane generally results in a urea-terminated polyurethane polymer of the above structure being present in the final product. However, the final product will typically be a mixture of products, of which a portion is the above urea terminated polyurethane polymer, the other portion being a normal distribution of other polymer products and may contain varying ratios of unreacted monomers. The heterogeneity of the resultant polymer will depend on the reactants selected as well as reactant conditions chosen.

After the polyurethane dispersion is prepared it is used in the dispersion of particles by known dispersion techniques.

Chain Termination Reactant.

The terminating agent is a primary or secondary monoamine which is added to make the urea termination. In Structure (I) the terminating agent is shown as $R_3(R_4)$N-substituent on the polyurethane. An optional substitution pattern for $R_3$ and $R_4$ are alkyl, a non-isocyanate reactive substituted/branched alkyl from an amine group, isocyanate reactive substituted/branched alkyl where an isocyanate reactive group is selected from hydroxyl, carboxyl, mercapto, and amide which have less isocyanate reactivity than primary or secondary amine.

The amount of chain terminator employed should be approximately equivalent to the free isocyanate groups in the pre-polymer. The ratio of active hydrogens from amine in the chain terminator to isocyanate groups in the pre-polymer is in the range from about 1.0:1 to about 1.2:1, more specifically from about 1.0:1.1 to about 1.1:1, and still more specifically from about 1.0:1.05 to about 1.1:1, on an equivalent basis. Although any isocyanate groups that are not terminated with an amine can react with other isocyanate reactive functional group and/or water the ratios of chain termination to isacyanate group is chosen to assure a urea termination. Amine termination of the polyurethane is avoided by the choice and amount of chain terminating agent leading to a urea terminated polyurethane. This results in better molecular weight control and better properties when uses as a particle dispersant and when freely added to formulations.

Any primary or secondary monoamines substituted with less isocyanate reactive groups may be used as chain terminators. Especially useful are aliphatic primary or secondary monoamines. Less isocyanate reactive groups could be hydroxyl, carboxyl, amide and mercapto. Example of monoamines useful as chain terminators include but are not restricted to Diethanolamine, monoethanolamine, 3-amino-1-propanol, isopropanolamine, N-ethylethanolamine, diisopropanolamine, 6-aminocaproic acid, 8-aminocaprylic acid, 3-aminoadipic acid, bis(methoxyethyl)amine(BMEA) etc. An optional isocyanate reactive chain terminator is diethanolamine. The diethanolamine is part of an optional class of urea terminating reactant where the substituents are hydroxyl functionalities which could provide improved pigment wetting.

The urea content in percent of the polyurethane is determined by dividing the mass of chain terminator by the sum of the other polyurethane components including the chain terminating agent. The urea content will be from about 2 wt % to about 14 wt %. The urea content will be optionally from about 2.5 wt % to about 10.5 wt %. The 2.0 wt % occurs when the polyether diols used are large, for instance $M_n$ is greater than about 4000 and/or the molecular weight of the isocyanate is high.

Polyisocyanate Component

Suitable polyisocyanates are those that contain either aromatic, cycloaliphatic or aliphatic groups bound to the isocyanate groups. Mixtures of these compounds may also be used. Preferred are compounds with isocyanates bound to a cycloaliphatic or aliphatic moieties. If aromatic isocyanates are used, cycloaliphatic or aliphatic isocyanates may be present as well. $R_1$ can be substituted with aliphatic groups.

Diisocyanates are preferred, and any diisocyanate useful in preparing polyurethanes and/or polyurethane-ureas from polyether glycols, diisocyanates and diols or amine can be used in this invention.

Examples of suitable diisocyanates include, but are not limited to, 2,4-toluene diisocyanate (TDI); 2,6-toluene diisocyanate; trimethyl hexamethylene diisocyanate (TMDI); 4,4'-diphenylmethane diisocyanate (MDI); 4,4'-dicyclohexylmethane diisocyanate ($H_{12}$MDI); 3,3'-dimethyl-4,4'-biphenyl diisocyanate (TODI); Dodecane diisocyanate ($C_{12}$DI); m-tetramethylene xylylene diisocyanate (TMXDI); 1,4-benzene diisocyanate; trans-cyclohexane-1,4-diisocyanate; 1,5-naphthalene diisocyanate (NDI); 1,6-hexamethylene diisocyanate (HDI); 4,6-xylyene diisocyanate; isophorone diisocyanate (IPDI); and combinations thereof.

Small amounts, optionally less than about 3 wt % based on the weight of the diisocyanate, of monoisocyanates or polyisocyanates can be used in mixture with the diisocyanate. Examples of useful monoisocyanates include alkyl isocyanates such as octadecyl isocyanate and aryl isocyanates such as phenyl isocyanate. Examples of a polyisocyanate are triisocyanatotoluene HDI trimer (Desmodur 3300), and polymeric MDI (Mondur MR and MRS).

Ionic Reactants

The hydrophilic reactant contains ionic and/or ionizable groups (potentially ionic groups). The ionic reactants which contain one or two, isocyanate reactive groups, as well as at least one ionic or ionizable group. In the structural description of the urea terminated polyether polyurethane described herein the reactant containing the ionic group is designated as $Z_2$. In the context of this disclosure, the term "isocyanate reactive groups" is taken to include groups well known to those of ordinary skill in the relevant art to react with isocyanates, and specifically hydroxyl, primary amino and secondary amino groups.

Examples of ionic dispersing groups include carboxylate groups (—COOM), phosphate groups (—$OPO_3$ $M_2$), phosphonate groups (—$PO_3$ $M_2$), sulfonate groups (—$SO_3$ M), quaternary ammonium groups (—$NR_3$Y, wherein Y is a monovalent anion such as chlorine or hydroxyl), or any other effective ionic group. M is a cation such as a monovalent metal ion (e.g., $Na^+$, $K^+$, $Li^+$, etc.), $H^+$, $NR_4^+$, and each R can be independently an alkyl, aryl/alkyl, aryl, or hydrogen. These ionic dispersing groups are typically located pendant from the polyurethane backbone.

The ionizable groups in general correspond to the ionic groups, except they are in the acid (such as carboxyl —COOH) or base (such as primary, secondary or tertiary amine —$NH_2$, —NRH, or —$NR_2$) form. The ionizable groups are such that they are readily converted to their ionic form during the dispersion/polymer preparation process as discussed below.

The ionic or potentially ionic groups are chemically incorporated into the polyurethane in an amount to provide an ionic content (with neutralization as needed) sufficient to render the polyurethane dispersible in the aqueous medium of the dispersion. Typical ionic content will range from about 10 up to about 190 milliequivalents (meq), optionally from about 20 to about 140 meq., per 100 g of polyurethane, and additionally less than about 90 meq per 100 g of urea terminated polyurethane.

With respect to compounds which contain isocyanate reactive groups and ionic or potentially ionic groups, the isocyanate reactive groups are typically amino and hydroxyl groups. The potentially ionic groups or their corresponding ionic groups may be cationic or anionic, although the anionic groups are preferred. Specific examples of anionic groups include carboxylate and sultanate groups. While examples of cationic groups include quaternary ammonium groups and sulfonium groups.

In the case of anionic group substitution, the groups can be carboxylic acid groups, carboxylate groups, sulphonic acid groups, sulphonate groups, phosphoric acid groups and phosphonate groups. The acid salts are formed by neutralizing the corresponding acid groups either prior to, during or after formation of the NCO pre-polymer.

Suitable compounds for incorporating carboxyl groups are described in U.S. Pat. Nos. 3,479,310, 4,108,814 and 4,408,008. Examples of carboxylic group-containing compounds are the hydroxy-carboxylic acids corresponding to the formula $(HO)_xQ(COOH)_y$ wherein Q represents a straight or branched, hydrocarbon radical containing 1 to 12 carbon atoms, where x is 1 or 2, and y is 1 to 3. Examples of these hydroxy-carboxylic acids include citric acid, tartaric acid and hydroxypivalic acid. Optional dihydroxy alkanoic acids include the alpha,alpha-dimethylol alkanoic acids represented by the Structure (IV):

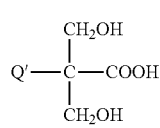

wherein Q' is hydrogen or an alkyl group containing 1 to 8 carbon atoms. The α,α-dimethylol alkanoic acids represented by the structural formula $R^7C—(CH_2OH)_2—COOH$, wherein $R^7$ is hydrogen or an alkyl group containing 1 to 8 carbon atoms. Examples of these ionizable diols include, but are not limited to, dimethylolacetic acid, 2,2'-dimethylolbutanoic acid, 2,2'-dimethylolpropionic acid ((DMPA), i.e., wherein Q' is methyl in the above formula), and 2,2'-dimethylolbutyric acid. Suitable carboxylates also include $H_2N—(CH_2)_4—CH(CO_2H)—NH_2$, and $H_2N—CH_2—CH_2—NH—CH_2—CH_2—CO_2Na$.

The optional sulfonate groups for incorporation into the polyurethanes are the diol sulfonates as disclosed in U.S. Pat. No. 4,108,814. Suitable dial sulfonate compounds also include hydroxyl terminated copolyethers comprising repeat units derived from the reaction of a dial and a sulfonated dicarboxylic acid. The specific sulfonated dicarboxylic acid/diol combination is 5-sulfo-isophthalic acid, and 1,3-propanediol. Other suitable sulfonates also include $H_2N—CH_2—CH_2—NH—(CH_2)_r—SO_3Na$, where r is 2 or 3.

When the ionic stabilizing groups are acids, the acid groups are incorporated in an amount sufficient to provide an acid group content for the urea-terminated polyurethane, known by those skilled in the art as acid number (mg KOH per gram solid polymer), of at least about 6, optionally at least about 10 milligrams KOH per 1.0 gram of polyurethane and even more specifically 20 milligrams KOH per 1.0 gram of polyurethane. The upper limit for the acid number (AN) is about 120, and optionally about 90.

Within the context of this disclosure, the term "neutralizing agents" is meant to embrace all types of agents which are useful for converting potentially ionic or ionizable groups to ionic groups. Accordingly, this term also embraces quaternizing agents and alkylating agents.

When amines are used as the neutralizing agent, the chain terminating reaction producing the urea termination is preferably completed prior to addition of the neutralizing agent that can also behave as an isocyanate reactive group.

In order to convert the anionic groups to the salt form either before, during or after their incorporation into the pre-polymers, either volatile or nonvolatile basic materials may be used to form the counterions of the anionic groups. Volatile bases are those wherein at least about 90% of the base used to form the counterion of the anionic group volatilizes under the conditions used to remove water from the aqueous polyurethane dispersions. Nonvolatile basic materials are those wherein at least about 90% of the base does not volatilize under the conditions used to remove water from the aqueous polyurethane dispersions.

Suitable volatile basic organic compounds for neutralizing the potential anionic groups are the primary, secondary or tertiary amines. Examples of these amines are trimethyl amine, triethyl amine, triisopropyl amine, tributyl amine, N,N-dimethyl-cyclohexyl amine, N,N-dimethylstearyl amine, N,N-dimethylaniline, N-methylmorpholine, N-ethylmorpholine, N-methylpiperazine, N-methylpyrrolidine, N-methylpiperidine, N,N-dimethyl-ethanol amine, N,N-diethyl-ethanol amine, triethanolamine, N-methyldiethanol amine, dimethylaminopropanol, 2-methoxyethyldimethyl amine, N-hydroxyethylpiperazine, 2-(2-dimethylaminoethoxy)-ethanol and 5-diethylamino-2-pentanone.

Suitable nonvolatile basic materials include monovalent metals, especially the alkali metals, lithium, sodium and potassium; with the basic counterions, hydroxides, carbonates or bicarbonates.

When the potential cationic or anionic groups of the polyurethane are neutralized, they provide hydrophilicity to the polymer and better enable it to be stably dispersed in water. The neutralization steps may be conducted (1) prior to polyurethane formation by treating the component containing the potentially ionic group(s), or (2) after polyurethane formation, but prior to dispersing the polyurethane. The reaction between the neutralizing agent and the potential anionic groups may be conducted between about 20° C. and about 150° C., but is normally conducted at temperatures below about 100° C., optionally between about 30° C. and about 80° C., and more specifically between about 50° C. and about 70° C., with agitation of the reaction mixture. The ionic or potentially ionic group may be used in amount of about 2 to about 20 percent by weight solids.

Other Isocyanate-Reactive Components

In addition to the diols $Z_1$ and $Z_2$ other diols may be included in the urea terminated polyurethane dispersant. These diols contain at least two hydroxyl groups, and optionally have a molecular weight of from about 60 to about 6000. The molecular weights can be determined by hydroxyl group analysis (OH number).

Examples of polymeric polyols include polyethers, polyacetals, polyester amides, polythioethers and mixed polymers. A combination of these polymers can also be used. For examples, a polyester polyol and a poly(meth)acrylate polyol may be used in the same polyurethane synthesis.

Suitable polyether polyols are obtained in a known manner by the reaction of starting compounds that contain reactive hydrogen atoms with alkylene oxides such as ethylene oxide, propylene oxide, butylene oxide, styrene oxide, tetrahydrofuran, epichlorohydrin or mixtures of these.

Polyethers that have been obtained by the reaction of starting compounds containing amine compounds can also be used. Examples of these polyethers as well as suitable polyhydroxy polyacetals, polyhydroxy polyacrylates, polyhydroxy polyester amides, polyhydroxy polyamides and polyhydroxy polythioethers, are disclosed in. U.S. Pat. No. 4,701,480, Silicone glycols are well known, and representative examples are described in U.S. Pat. No. 4,647,643.

These other diol components will lead to a polyurethane with different $R_2$ components. Depending on the sequence of addition during the synthesis of the polyurethane the distribution of the various diol, $R_2$ components can be random. Possible other diols and polyether diols include those shown in Structure (V) can either be based on alpha, omega dialcohol (j is 1) with at least 3 methylene groups (m is 3) and less than or equal to 30 methylene groups or a polyether diol (j greater than 1).

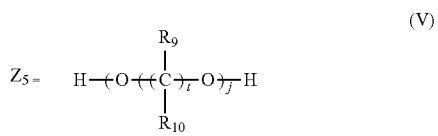

j is greater than or equal to 1,
when j is 1, t is greater than or equal to 3 to about 30,
when j is 2 or greater, t is greater than or equal to 3 to about 12;
$R_9$, $R_{10}$ are each independently selected from the group consisting of hydrogen, alkyl, substituted alkyl, and aryl; where the $R_9$ is the same or different with each substituted methylene group where $R_9$ and $R_9$ or $R_{10}$ can be joined to form a cyclic structure.

The additional polyether diol, $Z_5$, shown in Structure (V) {where j greater than 1} are oligomers and polymers in which at least 50% of the repeating units have 3 to 12 methylene groups in the ether chemical groups.

For j=2 or greater and t=3 the polyether diol is derived from 1,3-propanediol. The employed PO3G may be obtained by any of the various well known chemical routes or by biochemical transformation routes. The 1,3-propanediol may be obtained biochemically from a renewable source ("biologically-derived" 1,3-propanediol). The description of this biochemically obtained 1,3-propanediol can be found in co-owned filed US Patent Application US20080039582. This polyether diol for use in the urea terminated polyurethane may have a number average molecular weight ($M_n$) in the range of about 200 to about 5000, and more preferably from about 240 to about 3600. Blends of this polyether diol shown in Structure (V) can also be used. For example, the polyether diol shown in Structure (V) can comprise a blend of a higher and a lower molecular weight. For instance mixtures of Structure (V) can have a number average molecular weight of from about 1000 to about 5000, and another diol of Structure (V) can have a number average molecular weight of from about 200 to about 750. The $M_n$ of the blended, polyether diol shown in Structure (V) will preferably still be in the range of from about 250 to about 3600.

Pigments

A wide variety of organic and inorganic pigments, alone or in combination, may be dispersed with the urea terminated polyurethane dispersant to prepare an ink, especially an inkjet ink. The term "pigment" as used herein means an insoluble colorant that requires it to be dispersed with a dispersant and processed under dispersive conditions with the dispersant present. The insoluble colorant includes pigments and disperse dyes. The dispersion process results in a stable dispersed pigment. The pigment used with the inventive urea terminated polyurethane dispersants do not include self-dispersed pigments. The pigment particles are sufficiently small to permit free flow of the ink through the ink jet printing device, especially at the ejecting nozzles that usually have a diameter ranging from about 10 micron to about 50 micron.

The particle size also has an influence on the pigment dispersion stability, which is critical throughout the life of the ink. Brownian motion of minute particles will help prevent the particles from flocculation. It is also desirable to use small particles for maximum color strength and gloss. The range of useful particle size is typically about 0.005 micron to about 15 micron. Preferably, the pigment particle size should range from about 0.005 to about 5 micron and, optionally, from about 0.005 to about 1 micron. The average particle size as measured by dynamic light scattering is less than about 500 nm, optionally less than about 300 nm.

The selected pigment(s) may be used in dry or wet form. For example, pigments are usually manufactured in aqueous media and the resulting pigment is obtained as water-wet presscake. In presscake form, the pigment is not agglomerated to the extent that it is in dry form. Thus, pigments in water-wet presscake form do not require as much deflocculation in the process of preparing the inks as pigments in dry form. Representative commercial dry pigments are listed in U.S. Pat. No. 5,085,698.

In the case of organic pigments, the ink may contain up to approximately 30%, optionally about 0.1 to about 25%, and more specifically from about 0.25 to about 10% pigment by weight based on the total ink weight. If an inorganic pigment is selected, the ink will tend to contain higher weight percentages of pigment than with comparable inks employing organic pigment, and may be as high as about 75% in some cases, since inorganic pigments generally have higher specific gravities than organic pigments.

The urea terminated polyurethane polymer dispersant is present in the range of about 0.1 to about 20%, optionally in the range of about 0.2 to about 10%, by weight based on the weight of the total ink composition.

When the ionic content is low, less than about 90 meq per 100 g of polyurethane, the urea terminated polyurethane dispersant have a low salt stability. This low salt stability is associated with the phenomena that the pigment in the inkjet ink will crash out onto the surface of a substrate, especially paper and produce a high optical density. The optical density is similar to what has been obtained with self-dispersed pigments like those described in U.S. Pat. No. 6,852,156.

A characteristic of a dispersion with low salt stability is that when it is tested with salt solutions the urea terminated polyurethane dispersed pigment will come out of solution as described in US2005/00905099.

Unexpectedly, the urea terminated polyurethane dispersed pigment when they have an ionic content of less than about 90 meq per 100 g of polyurethane gives the improved optical density relative to pigment with acrylic and acrylate-based dispersants, but also give improved Distinctness of Image (DOI).

Polyurethane and Polyurethane Dispersion Preparation

The process of preparing the polyurethane dispersants of the invention begins with preparation of the polyurethane, which can be prepared by mixture or stepwise methods. The physical form of the polyurethane prior to its use as a dispersant is as a dispersion. In the mixture process, isocyanate terminated polyurethane is prepared by mixing the polyol of Structure (II), the ionic reactant, up to 50% other diols, and solvent, and then adding diisocyanate to the mixture. This reaction is conducted at from about 40° C. to about 100° C., and optionally from about 50° C. to about 90° C. The ratio of isocyanate to isocyanate reactive groups is from about 1.3:1 to about 1.05:1, and optionally from about 1.25:1 to about 1.1:1. When the targeted percent isocyanate is reached, then the primary or secondary amine chain terminator is added, and then base or acid is added to neutralize ionizable moieties incorporated from the ionizable reagent. The polyurethane solution is then converted to an aqueous polyurethane dispersion via the addition of water under high shear. If present, the volatile solvent is distilled under reduced pressure.

The NCO-functional pre-polymers should be substantially linear, and this may be achieved by maintaining the average functionality of the pre-polymer starting components at or below 2:1.

In some cases, addition of neutralization agent may be beneficial if added during early stages of the polyurethane synthesis. Alternatively, advantages may be achieved via the addition of the neutralization agent, as the alkali metal, simultaneously along with the water of inversion at high shear.

In the stepwise method, isocyanate terminated polyurethane is prepared by dissolving the ionic reactant in solvent, and then adding diisocyanate to the mixture. Once the initial percent isocyanate target is reached, the polyol component is added. This reaction is conducted at from about 40° C. to about 100° C., and optionally from about 50° C. to about 90° C. The ratio of isocyanate to isocyanate reactive groups is from about 1.3:1 to about 1.05:1, and more preferably from about 1.25:1 to about 1.1:1. Alternately, the diols and/or polyether polyols and up to 50% other diols may be reacted in the first step, and the ionic reactant may be added after the initial percent isocyanate target is reached. When the final targeted percent isocyanate is reached, then the chain terminator is added, and then base or acid is added to neutralize ionizable moieties incorporated from the ionizable reagent. The polyurethane solution is then converted to an aqueous polyurethane dispersion via the addition of water under high shear. If present, the volatile solvent is distilled under reduced pressure.

In all polyurethane reaction schemes if the neutralization reactant has isocyanate reaction capability, (for example an alcohol, primary amine or secondary amine) it cannot be added prior to the chain terminating, urea forming amine. If the neutralization agent can function as a chain terminating reactant according to Structure (I), then it must be added after all of the other isocyanate reactive groups have been reacted.

Catalysts are not necessary to prepare the polyurethanes, but may provide advantages in their manufacture. The catalysts most widely used are tertiary amines and organo-tin compounds such as stannous octoate, dibutyltin dioctoate, dibutyltin dilaurate.

Preparation of the polyurethane for subsequent conversion to a dispersion is facilitated by using solvent. Suitable solvents are those that are miscible with water and inert to isocyanates and other reactants utilized in forming the polyurethanes. If it is desired to prepare a solvent-free dispersion, then the solvent used should have sufficient volatility to allow removal by distillation. Typical solvents useful in the practice of the invention are acetone, methyl ethyl ketone, toluene, and N-methylpyrollidone. Alternatively, the polyurethane can be prepared in a melt with less than 5% solvent.

The polyurethane can be prepared by a multiple step process. Typically, in the first stage, a diisocyanate is reacted with a compound, polymer, or mixtures of compounds, mixture of polymers or a mixture thereof, each containing two NCO-reactive groups, to form a pre-polymer. An additional compound or compounds, all containing ≥2 NCO-reactive groups as well as a stabilizing ionic functionality, is also used to form an intermediate polymer. This intermediate polymer or pre-polymer can be terminated with either an NCO-group or a NCO-reactive group. The terminal groups are defined by the molar ratio of NCO to NCO-reactive groups in the pre-polymer stage. Typically, the pre-polymer is an NCO-terminated material that is achieved by using a molar excess of NCO. Thus, the molar ratio of diisocyanate to compounds containing two isocyanate-reactive groups is greater than 1.0:1.0, optionally greater than about 1.05:1.0 and even greater than about 1.1:1.0. In general, the ratios are achieved by preparing, in a first stage, an NCO-terminated intermediate by reacting one of the NCO-reactive compounds, having at least 2 NCO reactive groups, with all or part of the diisocyanate. This is followed, in sequence, by additions of other NCO-reactive compounds, if desired. When all reactions are complete the group, NCO and/or NCO-reactive groups will be found at the termini of the pre-polymer. These components are reacted in amounts sufficient to provide a molar ratio such that the overall equivalent ratio of NCO groups to NCO-reactive groups is achieved and the targeted urea content is obtained.

The finished NCO-containing pre-polymer should have an isocyanate content of about 1 to about 20%, optionally about 1 to about 10% by weight, based on the weight of pre-polymer solids.

Mixtures of compounds and/or polymers having mixed NCO reactive groups are also possible.

In order to have a stable dispersion, a sufficient amount of the ionic groups (if present) must be neutralized so that the resulting polyurethane will remain stably dispersed in the aqueous medium. Generally, at least about 70%, preferably at least about 80%, of the carboxylic acid groups are neutralized to the corresponding carboxylate salt groups. Alternatively, cationic groups in the polyurethane can be quaternary ammonium groups ($—NR_3Y$, wherein Y is a monovalent anion such as chlorine or hydroxyl).

Suitable neutralizing agents for converting the acid groups to salt groups include tertiary amines, alkali metal cations and ammonia. Examples of these neutralizing agents are disclosed U.S. Pat. No. 4,701,480. Neutralizing agents can be the trialkyl-substituted tertiary amines, such as triethyl amine, therapyl amine, dimethylcyclohexyl amine, dimethylethanol amine, and triethanol amine and dimethylethyl amine. Substituted amines are also useful neutralizing groups such as diethyl ethanol amine or diethanol methyl amine.

Neutralization may take place at any point in the process. Typical procedures include at least some neutralization of the pre-polymer, which is then chain extended/terminated in water in the presence of additional neutralizing agent.

Conversion to the aqueous dispersion is completed by addition of water. If desired, solvent can then be removed partially or substantially by distillation under reduced pressure. The final product is a stable, aqueous polyurethane dispersion having a solids content of up to about 60% by weight, preferably from about 10% to about 60% by weight, and more preferably from about 20% to about 45% by weight. However, it is always possible to dilute the dispersions to any minimum solids content desired. The solids content of the resulting dispersion may be determined by drying the sample in an oven at 150° C. for 2 hours and comparing the weights before and after drying. The particle size is generally below about 1.0 micron, and preferably between about 0.01 to about 0.5 micron. The average particle size should be less than about 0.5 micron, and optionally between about 0.01 to about 0.3 micron. The small particle size enhances the stability of the dispersed particles In accordance with the present invention the term "aqueous polyurethane dispersion" refers to aqueous dispersions of polymers containing urethane groups, as that term is understood by those of ordinary skill in the art. These polymers also incorporate hydrophilic functionality to the extent required to maintain a stable dispersion of the polymer in water. The compositions of the invention are aqueous dispersions that comprise a continuous phase comprising water, and a dispersed phase comprising polyurethane.

Fillers, plasticizers, pigments, carbon black, silica sols, other polymer dispersions and the known leveling agents, wetting agents, antifoaming agents, stabilizers, and other additives known for the desired end use, may also be incorporated into the dispersions.

Polyurethane Pigment Dispersion Preparation

The urea-terminated polyurethanes are dispersants for particles, such as pigments. In this case, the polyurethane is either 1) utilized as a dissolved polyurethane in a compatible solvent where the initial polyurethane/particle mixture is prepared and then processed using dispersion equipment to produce the aqueous polyurethane dispersed particle; or 2) the polyurethane dispersion and the particle dispersed are mixed in a compatible solvent system which, in turn is processed using dispersion equipment to produce the aqueous polyurethane dispersed particle. While not being bound by theory, it is assumed that the particle and the polyurethane have the appropriate physical/chemical interactions that are required for a stable dispersion. Furthermore, it is possible that some of the polyurethane is not bound to the pigment and exists either as a dispersion of the polyurethane or polyurethane dissolved in the liquid phase of the dispersion.

The urea terminated polyurethane and ink compositions of the invention may be prepared by methods known in the art. It is generally desirable to make the urea terminated polyurethane in a concentrated form, which is subsequently diluted with a suitable liquid containing the desired additives. The urea terminated polyurethane dispersion is first prepared by premixing the selected pigment(s) and urea terminated polyurethane polymeric dispersant(s) in an aqueous carrier medium (such as water and, optionally, a water-miscible solvent), and then dispersing or deflocculating the pigment. The dispersing step may be accomplished in a 2-roll mill, media mill, a horizontal mini mill, a ball mill, an attritor, or by passing the mixture through a plurality of nozzles within a liquid jet interaction chamber at a liquid pressure of at least 5,000 psi to produce a uniform dispersion of the pigment particles in the aqueous carrier medium (microfluidizer). Alternatively, the concentrates may be prepared by dry milling the polymeric dispersant and the pigment under pressure. The media for the media mill is chosen from commonly available media, including zirconia, YTZ, and nylon. These various dispersion processes are in a general sense well-known in the art, as exemplified by, U.S. Pat. Nos. 5,022,592, 5,026,427, 5,310,778, 5,891,231, 5,679,138, 5,976,232 and US20030089277. Routinely used milling processes include the 2-roll mill, media mill, and by passing the mixture through a plurality of nozzles within a liquid jet interaction chamber at a liquid pressure of at least 5,000 psi.

After the milling process is complete the pigment concentrate may be "let down" into an aqueous system. "Let down" refers to the dilution of the concentrate with mixing or dispersing, the intensity of the mixing/dispersing normally being determined by trial and error using routine methodology, and often being dependent on the combination of the polymeric dispersant, solvent and pigment. The determination of sufficient let down conditions is needed for all combinations of the polymeric dispersant, the solvent and the pigment.

After the urea terminated polyurethane dispersion preparation, the amount of water-miscible solvent may be more than some ink jet applications will tolerate. For some of the urea terminated polyurethane dispersions, it thus may be necessary to ultrafilter the final dispersion to reduce the amount of water-miscible solvent. To improve stability and reduce the viscosity of the pigment dispersion, it may be heat treated by heating from about 30° C. to about 100° C., with an optional temperature being about 70° C. for about 10 to about 24 hours. Longer heating does not affect the performance of the dispersion.

The amount of polymeric urea terminated polyurethane dispersants required to stabilize the pigment is dependent upon the specific urea terminated polyurethane dispersants, the pigment and vehicle interaction. The weight ratio of pigment to polymeric urea terminated polyurethane dispersants will typically range from about 0.5 to about 6. An optional range is about 0.75 to about 4.

While not being bound by theory, it is believed that the urea terminated polyurethane's provide improved ink properties by the following means. Stable aqueous dispersions are critical for inkjet inks to assure long-lived ink cartridges and few problems with failed nozzles, etc. It is, however, desirable for the ink to become unstable as it is jetted onto the media so that the pigment in the ink "crashes out" onto the surface of the media (as opposed to being absorbed into the media). With the pigment on the surface of the media, beneficial properties of the ink can be obtained.

The urea terminated polyurethane polymeric dispersants provide novel dispersants that sufficiently stabilize the ink prior to jetting (such as in the cartridge) but, as the ink is jetted onto the paper, the pigment system is destabilized and the pigment remains on the surface of the media. This leads to improved ink properties.

EXAMPLES

The following examples are presented for the purpose of illustrating the invention and are not intended to be limiting. All parts, percentages, etc., are by weight unless otherwise indicated.

The dispersions whose preparation is described in the examples below were characterized in terms of their particle size and particle size distribution.

Extent of Polyurethane Reaction

The extent of polyurethane reaction was determined by detecting NCO % by dibutylamine titration, a common method in urethane chemistry.

In this method, a sample of the NCO containing pre-polymer is reacted with a known amount of dibutylamine solution and the residual amine is back titrated with HCl.

Particle Size Measurements

The particle size for the polyurethane dispersions, pigments and the inks were determined by dynamic light scattering using a Microtrac UPA 150 analyzer from Honeywell/Microtrac (Montgomeryville Pa.).

This technique is based on the relationship between the velocity distribution of the particles and the particle size. Laser generated light is scattered from each particle and is Doppler shifted by the particle Brownian motion. The frequency difference between the shifted light and the unshifted light is amplified, digitalized and analyzed to recover the particle size distribution.

The reported numbers below are the volume average particle size.

Solid Content Measurement

Solid content for the solvent free polyurethane dispersions was measured with a moisture analyzer, model MA50 from Sartorius. For polyurethane dispersions containing high boiling solvent, such as NMP, tetraethylene glycol dimethyl ether, the solid content was then determined by the weight differences before and after baking in 150° C. oven for 180 minutes.

Urea Terminated Polyurethane Dispersant Example 1

Step 1. A diol with isocyanate grafted octane group was made. To a dry, alkali- and acid-free flask, equipped with an addition funnel, a condenser, stirrer and a nitrogen gas line was added 31.7 g IPDI and 18.5 g 1-Octanol. The contents were agitated at room temperature until NCO % was 11.90%. Then 15.4 g DEA and 60 g acetone was added. The mixture was cooled to room temperature and a diol grafted with an alkyl graft derived from the octanol (Structure III) solution was obtained.

Step 2. To a dry, alkali and acid-free flask, equipped with an addition funnel, a condenser, stirrer and a nitrogen gas was added 55 g diol solution from Step 1, 50 g Terathane 250, 250 MW polyether diol from Invista, 25 g DMPA, 17.7 g TEA, 75 g acetone and 0.04 g DBTL. The contents were heated to 40° C. and mixed well. 126 g IPDI was then added to the flask via the addition funnel at 40° C. over 60 min, with any residual IPDI being rinsed from the addition funnel into the flask with 10 g acetone.

The flask temperature was raised to 50° C., held at 50° C. until NCO % was 2.6% or less, then 22.2 g DEA was added over 5 minutes followed by 5 gram acetone rinse. After 1 hour at 50° C., 525 g deionized (DI) water was added over 10 minutes via the addition funnel. The mixture was held at 50° C. for 1 hr, then cooled to room temperature.

Acetone (−113 g) was removed under vacuum, leaving a polyurethane solution with about 28.1% solids by weight. The final polyurethane dispersion had a viscosity of 500 cP, pH 8.25, particle size of d50=8 nm.

Urea Terminated Polyurethane Dispersant Example 2

Step 1. A diol with isocyanate grafted octane group was made. To a dry, alkali- and acid-free flask, equipped with an addition funnel, a condenser, stirrer and a nitrogen gas line was added 55.5 g IPDI and 32.33 g 1-Octanol. The contents were agitated at room temperature until NCO % was 11.90%. Then 65 g LG-650, a 260 MW polyether trial from Bayer, and 0.04 g DBTL was added. The mixture was heated to 75° C. and held for 5 hours until NCO % reached zero. The mixture was then cooled to room temperature and grafted with an alkyl graft derived from the octanol (Structure II) diol was obtained.

Step 2. To a dry, alkali and acid-free flask, equipped with an addition funnel, a condenser, stirrer and a nitrogen gas was added 40 g dial from step 1, 50 g Terathane 250, a 250 MW polyether diol from Invista, 16 g DMPA, 11.3 g TEA, 61 g acetone and 0.04 g DBTL. The contents were heated to 40° C. and mixed well. 107 g IPDI was then added to the flask via the addition funnel at 40° C. over 60 min, with any residual IPDI being rinsed from the addition funnel into the flask with 10 g acetone.

The flask temperature was raised to 50° C., held at 50° C. until NCO % was 2.8% or less, then 19.4 gram DEA was added over 5 minutes followed by 5 gram acetone rinse. After 1 hour at 50° C., 396 g deionized (DI) water was added over 10 minutes via the addition funnel. The mixture was held at 50° C. for 1 hr, then cooled to room temperature.

Acetone (−76 g) was removed under vacuum, leaving a polyurethane solution with about 28.7% solids by weight. The final polyurethane dispersion had a viscosity of 500 cP, pH 7.06, particle size of d50=30 nm.

Urea Terminated Polyurethane Dispersant Example 3

Step 1. A diol with isocyanate grafted fluorocarbon group was made. To a dry, alkali- and acid-free flask, equipped with an addition funnel, a condenser, stirrer and a nitrogen gas line was added 88.6 gram Zonyl BA-L, a fluoroalcohol containing 70% fluorine from DuPont, and 44.4 g IPDI. The contents were agitated at room temperature until NCO % was 6.3%. Then 20.4 g DEA and 60.0 g acetone was added. The mixture was held at room temperature until NCO % reached zero. A diol grafted with a fluoro alkyl (Structure III) solution was obtained.

Step 2. To a dry, alkali and acid-free flask, equipped with an addition funnel, a condenser, stirrer and a nitrogen gas was added 80 g diol solution from Step 1, 50 g Terathane 250, a 250 MW polyether diol from Invista, 40 g DMPA, 27 g TEA, 94 g acetone and 0.06 g DBTL. The contents were heated to 40° C. and mixed well. 159 g IPDI was then added to the flask via the addition funnel at 40° C. over 60 min, with any residual IPDI being rinsed from the addition funnel into the flask with 10 g acetone.

The flask temperature was raised to 50° C., held at 50° C. until NCO % was 2.75% or less, then 27.9 gram DEA was added over 5 minutes followed by 5 gram acetone rinse. After 1 hour at 50° C., 576 g deionized (DI) water was added over 10 minutes via the addition funnel. The mixture was held at 50° C. for 1 hr, then cooled to room temperature.

Acetone (−133 g) was removed under vacuum, leaving a polyurethane solution with about 44.5% solids by weight. The final polyurethane dispersion had a viscosity of 300 cP, pH 7.26, particle size of d50=8 nm.

Comparative Polyurethane Dispersant 1 (DEA Terminated 1,6 Hexane Diol, AN60)

To a dry, alkali- and acid-free flask, equipped with an addition funnel, a condenser, stirrer and a nitrogen gas line was added 55 g 1,6 Hexanediol, 48 g DMPA, 32.2 g TEA, 100 g acetone and 0.06 g DBTL. The contents were heated to 40° C. and mixed well. 227 g IPDI was then added to the flask via the addition funnel at 40° C. over 60 min, with any residual IPDI being rinsed from the addition funnel into the flask with 10 g acetone.

The flask temperature was raised to 50° C., held at 50° C. until NCO % was 3.5% or less, then 39.5 gram DEA was added over 5 minutes followed by 5 gram acetone rinse. After 1 hour at 50° C., 613 g deionized (DI) water was added over 10 minutes via the addition funnel. The mixture was held at 50° C. for 1 hr, then cooled to room temperature.

Acetone (−115 g) was removed under vacuum, leaving a polyurethane solution with about 35.0% solids by weight. The final polyurethane dispersion had a viscosity of 30 cP, pH 7.5, particle size of d50=86.5 nm.

Comparative Polyurethane Dispersant 2 (T650/DMBA/DEA, AN40)

To a dry, alkali- and acid-free flask, equipped with an addition funnel, a condenser, stirrer and a nitrogen gas line was added 125 g Terathane 650, a 650 MW polyether dial from Invista, 25 g DMBA, and 0.04 g DBTL. The contents were heated to 90° C. and mixed well. 110 g TMXDI was then added to the flask via the addition funnel at 90° C. over 60 min. The flask temperature was raised to 95° C., held at 95° C.

until NCO % was 2.9% or less, then 17.8 gram DEA was added over 5 minutes. After 1 hour at 95° C., the flask temperature was lowered to 75° C. 15.4 gram TEA was then added followed by 465 g deionized (DI) water over 10 minutes via the addition funnel. The mixture was held at 75° C. for 1 hr, then cooled to room temperature.

The final polyurethane dispersion had a viscosity of 40 cP, 37.6% solids, pH 7.9, particle size of d50=14.5 nm.

Comparative Polyurethane Dispersant 3
(T650/TMXDI/DMBA/Aminoacid/DEA, AN 40)

To a dry, alkali- and acid-free flask, equipped with an addition funnel, a condenser, stirrer and a nitrogen gas line was added 155 g Terathane 650, a 650 MW polyether diol from Invista, 18 g DMBA, and 0.04 g DBTL. The contents were heated to 90° C. and mixed well. 110 g TMXDI was then added to the flask via the addition funnel at 90° C. over 60 min. The flask temperature was raised to 95° C., held at 95° C. for 1 hour, then 8 gram DEA was added over 5 minutes and held at 95° C. until NCO % was 1.5% or lower. The flask temperature was lowered to 75° C. 11.55 TEA was added and mixed well. 325 g deionized (DI) water was added over 10 minutes via the addition funnel followed by mixture of 6-aminocaproic acid (13.6 g), TEA (9.4 g) and water (130 g) solution. The dispersion was held at 75° C. for 1 hr, then cooled to room temperature.

The final polyurethane dispersion had a viscosity of 40 cP, 28% solids, pH 10, particle size of d50=18.5 nm.

Comparative Polyurethane Dispersant 4 Diamine as Chain Extender

To a dry, alkali- and acid-free flask, equipped with an addition funnel, a condenser, stirrer and a nitrogen gas line was added 699.2 g Desmophen C 1200, a polyester carbonate diol, (Bayer), 280.0 g acetone and 0.06 g DBTL. The contents were heated to 40° C. and mixed well. 189.14 g IPDI was then added to the flask via the addition funnel at 40° C. over 60 min, with any residual IPDI being rinsed from the addition funnel into the flask with 15.5 g acetone.

The flask temperature was raised to 50° C., held for 30 minutes then followed by 44.57 g DMPA, then followed by 25.2 g TEA, was added to the flask via the addition funnel, which was then rinsed with 15.5 g acetone. The flask temperature was then raised again to 50° C. and held at 50° C. until NCO % was 1.14% or Less.

With the temperature at 50° C., 1520.0 g deionized (DI) water was added over 10 minutes, followed by 131.00 g EDA (as a 6.25% solution in water) over 5 minutes, via the addition funnel, which was then rinsed with 80.0 g water. The mixture was held at 50° C. for 1 hr, then cooled to room temperature.

Acetone (−310.0 g) was removed under vacuum, leaving a final dispersion of polyurethane with about 35.0% solids by weight.

Preparation of Pigmented Dispersions

Pigmented dispersions were prepared with magenta, yellow, cyan and black pigments. For the Examples in Table 1, the following pigments were used Clarient Hostaperm Pink E-02, PR-122 (Magenta), and Degussa's Nipex 180 IQ powder (Black, K).

The following procedure was used to prepare the pigment dispersions with invention dispersing resin. Using an Eiger Minimill, the premix was prepared at typically 20-30% pigment loading and the targeted dispersant level was selected at a P/D (pigment/dispersant) ratio of 1.5-3.0. A P/D of 2.5 corresponds to a 40% dispersant level on pigment. Optionally, a co-solvent was added at 10% of the total dispersion formulation to facilitate pigment wetting and dissolution of the resins in premix stage and ease of grinding during milling stage. Although other similar co-solvents are suitable, triethylene glycol monobutyl ether (TEB as supplied from Dow Chemical) was the co-solvent of choice. The invention resins were pre-neutralized with either KOH or amine to facilitate solubility and dissolution into water. During the premix stage the pigment level was maintained at typically 27% and was subsequently reduced to about 24% during the milling stage by adding deionized water for optimal media mill grinding conditions. After completion of the milling stage, which was typically 4 hours, the remaining letdown of de-ionized water was added and thoroughly mixed.

All the pigmented dispersions processed with co-solvent were purified using an ultrafiltration process to remove co-solvent(s) and filter out other impurities and ions that may be present. After completion, the pigment levels in the dispersions were reduced to about 10 to 15%. A total of 3 different magenta and 4 black dispersions were prepared with the invention dispersing resins, which are shown in Table 1 below.

After completion of milling process, the dispersion was filled into a polyethylene container. The dispersions were tested for pH, conductivity, viscosity and particle size. To assess dispersion stability, the above properties were re-measured after oven aging of samples for 1 week at 70° C. and noting if significant change versus initial readings had occurred.

Example Pigment Dispersions

Tabulated below are pigment dispersions stabilized with the urea terminated polyurethane dispersants, synthesized by the method previously outlined above. The polyurethane dispersants listed refer to the Polyurethane Dispersants listed above. The comparative examples use the comparative polyurethanes described above.

The initial dispersion properties are tabulated in Table 1. The initial particle size, viscosity, and conductivity for these dispersions were 68-144 nm, 3.1-9.8 cP, and 0.71-2.1 mS/cm, respectively, with the pH ranging from 8.1 to 9.9.

TABLE 1

Pigments Dispersion Examples

| Pigment Dispersion | Pig. % | Pigment/ Dispersant | Polyurethane Dispersant Example | Particle Size d50, nm | Viscosity (cP) | pH |
|---|---|---|---|---|---|---|
| Inventive K1 | 15 | 2.5 | 1 | 99.8 | 4.2 | 6.7 |
| Inventive K1 | 15.2 | 2.5 | 2 | 133.7 | 5.2 | 7.0 |
| Inventive K3 | 15 | 2.5 | 3 | 90.5 | 4.6 | 6.9 |
| Comp M1 | 12.6 | 2.5 | Comp Pud 2 | 102 | 5.9 | 8.5 |
| Comp M2 | 12.5 | 2.5 | Comp Pud 3 | 95 | 5.9 | 8.8 |
| Comp. M3 |  | 2.5 | Comp Pud 4 | NA | Gelled | NA |
| Comp K1 | 14.7 | 2.5 | Comp Pud 1 | 98 | 3.6 | 6.8 |

In addition, a dispersion Comparative Dispersion Magenta-1 was made from the Comparative Dispersant 4, a diamine chain extended polyurethane dispersion. This dispersant failed as a dispersant for the magenta pigment. It gelled at the pre-mix stage of the dispersion process.

Preparation of Inks

The inks were prepared with pigmented dispersions made using invention-dispersing polymers described above, by conventional process known to the art. The pigmented dispersions are processed by routine operations suitable for inkjet ink formulation.

Typically, as in preparing ink, all ingredients except the pigmented dispersion were first mixed together. After all the other ingredients were mixed, the pigmented dispersion was added. Common ingredients in ink formulations useful in pigmented dispersions include one or more humectants, co-solvent(s), one or more surfactants, a biocide, a pH adjuster, and de-ionized water.

The selected black and magenta pigmented dispersions from Example dispersions in Table 1 were prepared into ink formulations in which the targeted percent pigment in ink jet ink was 4.0%. Water, Polyurethane binder, Dowanol TPM, 1,2-hexanediol, ethylene glycol, Surfynol 445, and Proxel GXL were mixed with the prepared pigment dispersions in the percentages detailed in Table 2. Polyurethane binder is a crosslinked polyurethane dispersion prepared as PUD EXP1 in US 20050215663 A1; Dowanol TPM is Tripropylene glycol methyl ether from Dow Chemica; Proxel GXL is a biocide available from Avecia, Inc.; and Surfynol 440 is a surfactant available from Air Products. The inks were mixed for 4 hours and then filtered through a 1 micron filtration apparatus, removing any large agglomerates, aggregates or particulates.

TABLE 2

Black Ink Composition

| Ink Ingredient | Weight % in Ink |
| --- | --- |
| 1,2 hexanediol | 7.00% |
| Dowanol TPM | 2.60% |
| Ethylene glycol | 6.3% |
| Surfynol 440 | 0.25% |
| Proxel GXL | 0.15% |
| Polyurethane binder | 4.00% |
| Pigment | 4.00% |
| Water | Balance |

Ink Properties

The ink properties measured were pH, viscosity, conductivity, particle size and surface tension. The particle size was measured using a Leeds and Northrup, Microtrac Ultrafine Particle Analyser (UPA). The viscosity was measured with a Brookfield Viscometer (Spindle 00, 25° C., 60 rpm). The properties of the inks prepared using example dispersions containing invention dispersing resins are reported in Table 3.

Jet velocity, drop size and stability are greatly affected by the surface tension and the viscosity of the ink. Inkjet inks typically have a surface tension in the range of about 20 dyne/cm to about 60 dyne/cm at 25° C. Viscosity can be as high as 30 cP at 25° C., but is typically significantly lower. The inks have physical properties compatible with a wide range of ejecting conditions, i.e., driving frequency of the piezo element, or ejection conditions for a thermal head, for either a drop-on-demand device or a continuous device, and the shape and size of the nozzle. The inks of this invention have excellent storage stability for long periods so as not clog to a significant extent in an ink jet apparatus. Further, it should not alter the materials of construction of the ink jet printing device it comes in contact with, and be essentially odorless and non-toxic.

Although not restricted to any particular viscosity range or printhead, the inventive inks are suited to lower viscosity applications such as those required by higher resolution (higher dpi) printheads that jet small droplet volumes, e.g. less than about 20 pL. Thus the viscosity (at 25° C.) of the inventive inks can be less than about 10 cP, optionally less than about 7 cP.

TABLE 3

Ink Properties of Pigmented Inks using Polyurethane Dispersants

| Ink | pH | Viscosity (cP) | Particle Size $d_{50}$ | Surface Tension dynes/cm |
| --- | --- | --- | --- | --- |
| Ink K-1 | 8.2 | 3.5 | 120 | 32 |
| Ink K-2 | 8.0 | 9.3 | 150 | 33 |

Printing Properties

The Inkjet inks with invention dispersing resins were printed using a commercially available Epson 3000 piezo printhead type printer although any suitable inkjet printer could be used. The substrate used was 419 100% cotton from Test fabrics. The printed textiles may optionally be post processed with heat and/or pressure, such as disclosed in US20030160851 In this case, all test prints were fused at about 170° C. for about 2 minutes.

Colorimetric measurements were done using a Minolta Spectrophotometer CM-3600d using Spectra Match software.

Where indicated the printed textile was tested for washfastness according to methods developed by the American Association of Textile Chemists and Colorists, (AATCC), Research Triangle Park, N.C. The AATCC Test Method 61-1996, "Colorfastness to Laundering, Home and Commercial: Accelerated", was used. In that test, colorfastness is described as "the resistance of a material to change in any of its color characteristics, to transfer of its colorant(s) to adjacent materials or both as a result of the exposure of the material to any environment that might be encountered during the processing, testing, storage or use of the material." Tests 3A was done and the color washfastness and stain rating were recorded. The ratings for these tests are from 1-5 with 5 being the best result, that is, little or no loss of color and little or no transfer of color to another material, respectively. Crock measurements were made using methodology described in AATCC Test Method 8-1996.

The printing results using an Epson 3000 piezo type printer, for selective inks make with pigments stabilized by invention dispersing resins are reported in Table 4.

TABLE 4

Print Properties of Pigmented Inks with Polyurethane Dispersants

| Ink | OD | 3A washfastness | Dry Crock | Wet Crock |
| --- | --- | --- | --- | --- |
| Ink-K1 | 1.07 | 3.0 | 2.5 | 1.5 |
| Ink-K2 | 0.96 | 2.5 | 2.4 | 1.2 |

What is claimed is:

1. An aqueous colorant dispersion comprising a comprising a colorant and a urea terminated polyurethane ionic dispersant in an aqueous vehicle, wherein:
   (a) at least some of the ionic dispersant is physically adsorbed to the colorant,
   (b) the polymeric ionic dispersant stably disperses the pigment in the aqueous vehicle, (c) the volume average particle size of the dispersion is less than about 300 nm,
wherein the urea terminated polyurethane dispersant comprises at least one compound of the general Structure (I):

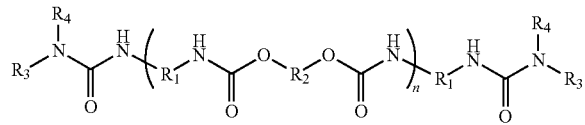

$R_1$ is alkyl, alkyl substituted with an ionizable or ionic group, alkyl/aryl from a diisocyanate substituted with an ionizable or ionic group, $R_3$ is alkyl, branched alkyl, or an isocyanate reactive group from an amine terminating group, $R_4$ is hydrogen, alkyl, branched alkyl, or an isocyanate reactive group from the amine terminating group;

wherein the isocyanate reactive group is selected from the group consisting of hydroxyl, carboxyl, mercapto, and amido;

n is 2 to 30;

and wherein $R_2$ is at least one $Z_2$ and at least one $Z_1$ or $Z_3$;

$Z_2$ is a diol substituted with an ionic group;

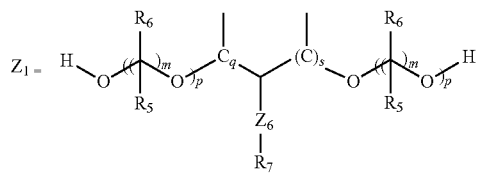

p is greater than or equal to 1,
m is equal to 2 to about 12;
where q is 1 to about 4 and s is 0, or 1 to about 4;
$R_5$, $R_6$ each is independently selected from the group consisting of hydrogen, alkyl, alkyl substituted with an ionizable or ionic group, and aryl; where the $R_5$ or $R_6$ are the same or different with each substituted methylene group; where the $R_5$ or $R_6$ can be joined to form a cyclic structure;

$R_7$ is a urethane or urea grafted alkyl, aryl or fluorocarbon chain;

$Z_6$ is a bond or an ether linkage;

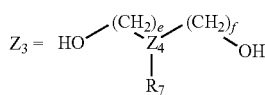

e and f are 1 to 6,
$Z_4$ is N or $CR_8$, where $R_8$ is hydrogen, alkyl or aryl,
$R_7$ is as defined above,
wherein the urea content of the urea-terminated polyurethane is at least 2 wt % of the polyurethane and at most about 14 wt % of the polyurethane,
and further wherein the colorant is selected from pigments and disperse dyes or combinations of pigments and disperse dyes.

2. The aqueous colorant dispersion of claim 1, where the urea content of the urea terminated polyurethane is at least about 2.5 wt % and at most about 10.5 wt %.

3. The aqueous colorant dispersion of claim 1, where the ionic content of the polyurethane is 10 to 190 milliequivalents per 100 g of polyurethane.

4. The aqueous colorant dispersion of claim 1, where the ionic content of the polyurethane is 20 to 140 milliequivalents per 100 g of polyurethane.

5. The aqueous colorant dispersion of claim 1, where the ionic content of the polyurethane is 25 to 90 milliequivalents per 100 g of polyurethane.

6. The aqueous colorant dispersion of claim 1, where the colorant to urea terminated polyurethane dispersant ratio is from about 0.5 to about 6 on a weight basis.

7. The aqueous colorant dispersion of claim 1, where $R_2$ comprises at least $Z_2$, at least one $Z_1$ or $Z_3$ and at least one additional diol of the general structure (V)

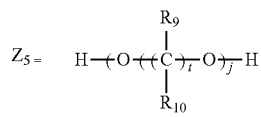

j is greater than or equal to 1,
when j is 1, t is greater than or equal to 3 to about 30,
when j is 2 or greater, t is greater than or equal to about 12;
$R_9$, $R_{10}$ each is independently selected from the group consisting of hydrogen, alkyl, alkyl substituted with an ionizable or ionic group, and aryl; where the $R_9$ is the same or different with each substituted methylene group where the $R_9$ and the $R_9$ or $R_{10}$ can be joined to form a cyclic structure.

8. An aqueous colored ink jet ink comprising the aqueous colorant dispersion of claim 1, having from about 0.1 to about 10 wt % pigment based on the total weight of the ink, a weight ratio of colorant to urea terminated polyurethane dispersant of from about 0.5 to about 6, a surface tension in the range of about 20 dyne/cm to about 70 dyne/cm at 25° C, and a viscosity of lower than about 30 cP at 25° C.

9. An inkjet ink composition comprising an aqueous vehicle and colorant particles stabilized by an urea terminated polyurethane dispersant in an aqueous vehicle wherein the urea terminated polyurethane dispersant comprises at least one compound of the general Structure (I):

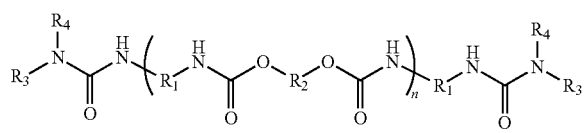

$R_1$ is alkyl, alkyl substituted with an ionizable or ionic group, substituted alkyl/aryl from a diisocyanate substituted with an ionizable or ionic group, $R_3$ is alkyl, branched alkyl, or an isocyanate reactive group from the amine terminating group, $R_4$ is hydrogen, alkyl, branched alkyl, or an isocyanate reactive group from the amine terminating group;

wherein the isocyanate reactive group is selected from the group consisting of hydroxyl, carboxyl, mercapto, and amido;

n is 2 to 30;

and wherein $R_2$ is at least one $Z_2$ and at least one $Z_1$ or $Z_3$;

$Z_2$ is a diol substituted with an ionic group;

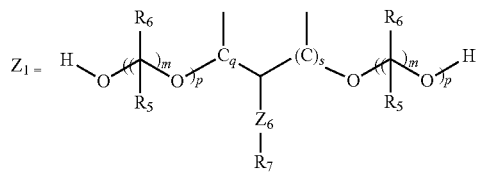

p is greater than or equal to 1, m is equal to 2 to about 12;

where q is 1 to about 4 and s is 0, or 1 to about 4;

$R_5$, $R_6$ each is independently selected from the group consisting of hydrogen, alkyl, alkyl substituted with an ionizable or ionic group, and aryl; where the $R_5$ or $R_6$ are the same or different with each substituted methylene group; where the $R_5$ or $R_6$ can be joined to form a cyclic structure;

$R_7$ is a urethane or urea grafted alkyl, aryl or fluorocarbon chain;

$Z_6$ is a bond or an ether linkage;

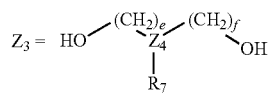

e and f are 1 to 6, $Z_4$ is N or $CR_8$, where $R_8$ is hydrogen, alkyl or aryl, $R_7$ is as defined above, wherein the urea content of the urea-terminated polyurethane is at least 2 wt % of the polyurethane and at most about 14 wt % of the polyurethane, and further wherein the colorant is selected from pigments and disperse dyes or combinations of pigments and disperse dyes.

10. A process for making a dispersed pigment comprising the step of mixing the pigment and a urea terminated polyurethane dispersant of claim 1, in an aqueous carrier medium, then dispersing or deflocculating the pigment.

11. The method of claim 10, wherein the dispersing is accomplished in a process selected from the group consisting of 2-roll milling, media milling, and by passing the mixture through a plurality of nozzles within a liquid jet interaction chamber at a liquid pressure of at least 5,000 psi.

12. A process for making a dispersed pigment comprising the steps of a) preparing a urea terminated polyurethane dispersant and then mixing the pigment and the urea terminated polyurethane dispersant in an aqueous carrier medium, then dispersing or deflocculating the pigment where the urea terminated polyurethane (Structure I):

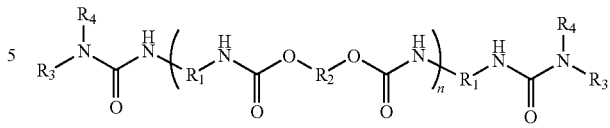

$R_1$ is alkyl, alkyl substituted with an ionizable or ionic group, alkyl/aryl from a diisocyanate substituted with an ionizable or ionic group, $R_3$ is alkyl, branched alkyl, or an isocyanate reactive group from an amine terminating group, $R_1$ is hydrogen, alkyl, branched alkyl, or an isocyanate reactive group from the amine terminating group;

wherein the isocyanate reactive group is selected from the group consisting of hydroxyl, carboxyl, mercapto, and amido;

n is 2 to 30;

and wherein $R_2$ is at least one $Z_2$ and at least one $Z_1$ or $Z_3$;

$Z_2$ is a diol substituted with an ionic group;

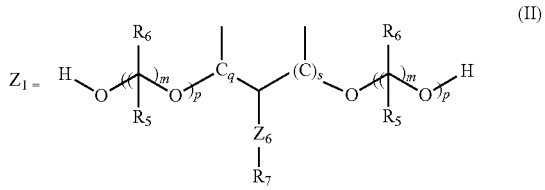

p is greater than or equal to 1, m is equal to 2 to about 12;

where q is 1 to about 4 and s is 0, or 1 to about 4;

$R_5$, $R_6$ each is independently selected from the group consisting of hydrogen, alkyl, alkyl substituted with an ionizable or ionic group, and aryl; where the $R_5$ or $R_6$ are the same or different with each substituted methylene group; where the $R_5$ or $R_6$ can be joined to form a cyclic structure;

$R_7$ is a urethane or urea grafted alkyl, aryl or fluorocarbon chain;

$Z_6$ is a bond or an ether linkage;

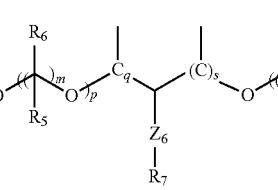

e and f are 1 to 6;

$Z_4$ is N or $CR_8$, where $R_8$ is hydrogen, alkyl or aryl, $R_7$ is as defined above, is prepared by (a) providing reactants comprising (i) at least one diol $Z_1$ or $Z_3$ ii) at least one poliyisocyanate component comprising a diisocyanate, and (iii) at least one hydrophilic reactant comprising at least one isocyanate reactive ingredient containing an ionic group, $Z_2$;

(b) contacting (i), (ii) and (iii) in the presence of a water-miscible organic solvent to form an isocyanate-functional polyurethane pre-polymer;

(c) adding water to form an aqueous dispersion; and (d) prior to, concurrently with or subsequent to step (c), chain-terminating the isocyanate-functional prepolymer with a primary or secondary amine.

13. The aqueous colorant dispersion of claim 1, where the colorant is a pigment or disperse dye.

14. The aqueous colorant dispersion of claim 1, where the colorant to urea terminated polyurethane dispersant ratio is from about 0.5 to about 6 on a weight basis.

15. The aqueous colorant dispersion of claim 1 where the colorant to urea terminated polyurethane dispersant ratio is from about 0.75 to about 4 on a weight basis.

16. The aqueous colorant dispersion of claim 1 formulated for inkjet printing on textiles.

17. The inkjet ink composition of claim 9 formulated for inkjet printing on textiles.

18. The aqueous colorant dispersion of claim 1 where at least one $Z_1$ is a dial derived from a polyether trial having a molecular weight of about 260.

19. The aqueous colorant dispersion of claim 18, where $R_2$ comprises at least $Z_2$, at least one $Z_1$ or $Z_3$ and at least one additional diol of the general structure (V)

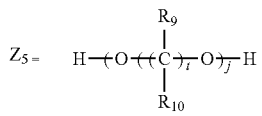

j is greater than or equal to 1,
when j is 1, t is greater than or equal to 3 to about 30,
when j is 2 or greater, t is greater than or equal to about 12;
$R_9$, $R_{10}$ each is independently selected from the group consisting of hydrogen, alkyl, alkyl substituted with an ionizable or ionic group, and aryl; where the $R_9$ is the same or different with each substituted methylene group where the $R_9$ and the $R_9$ or $R_{10}$ can be joined to form a cyclic structure.

20. The aqueous colorant dispersion of claim 1 where $Z_1$ has a molecular weight of from about 250 to about 650.

* * * * *